United States Patent Office 3,313,429
Patented Apr. 11, 1967

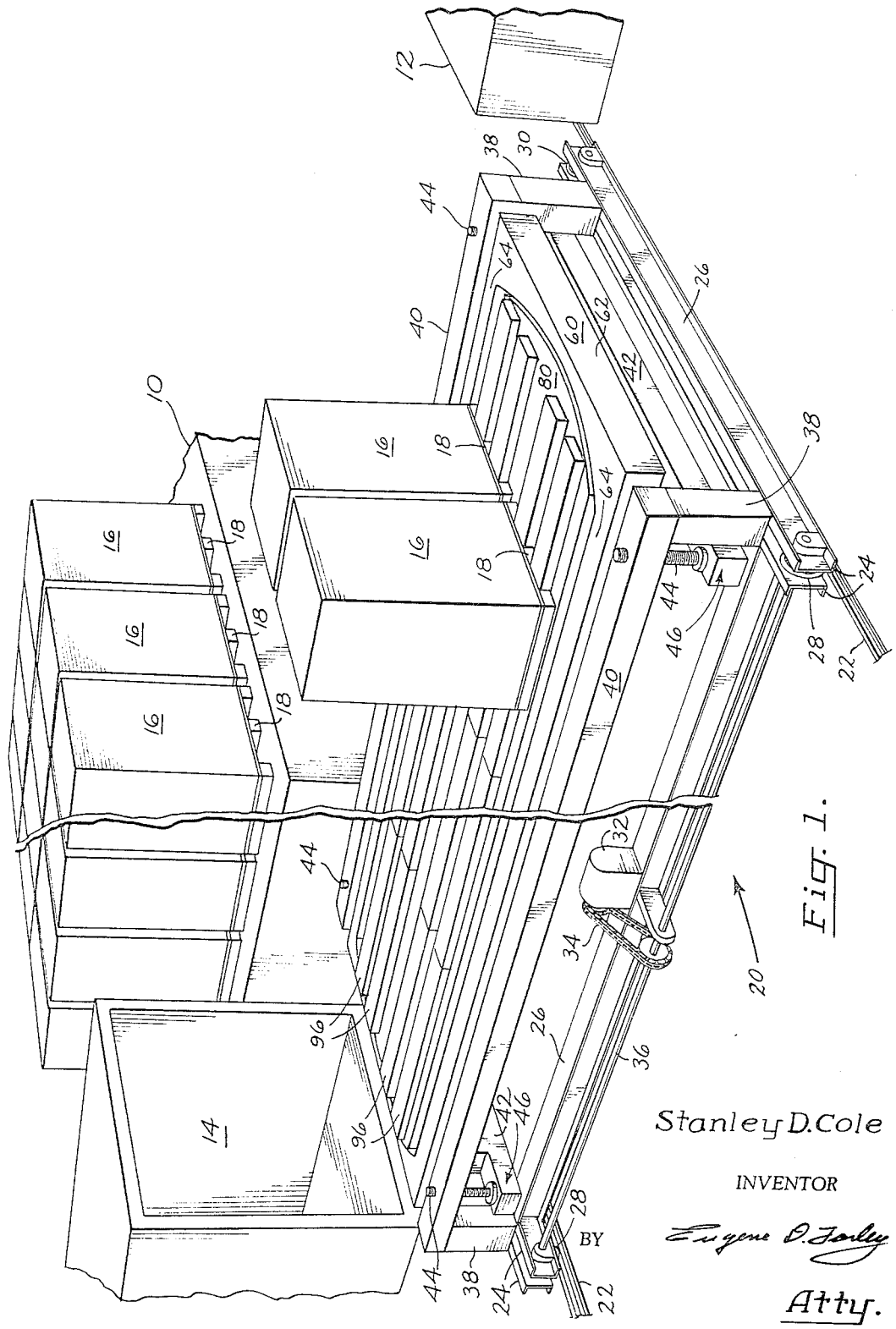

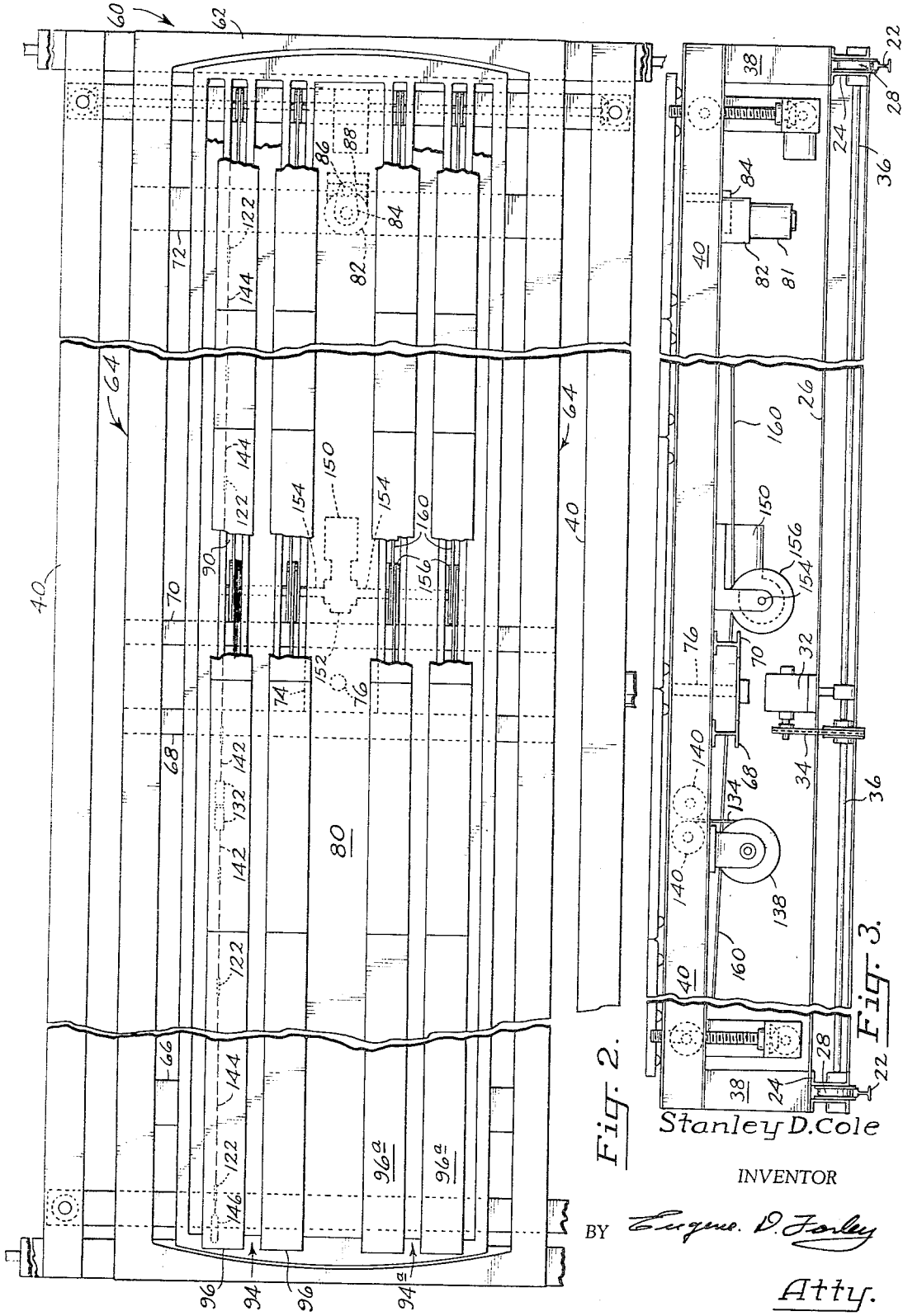

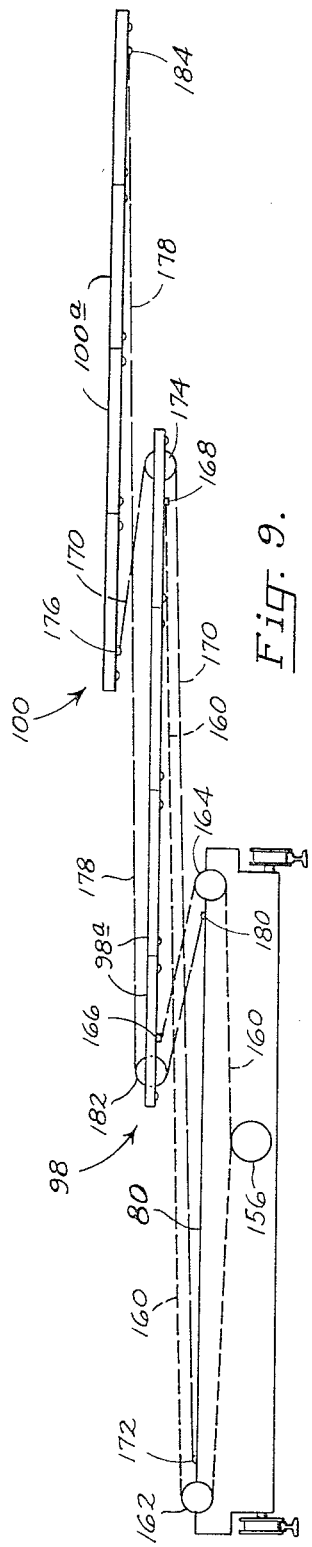
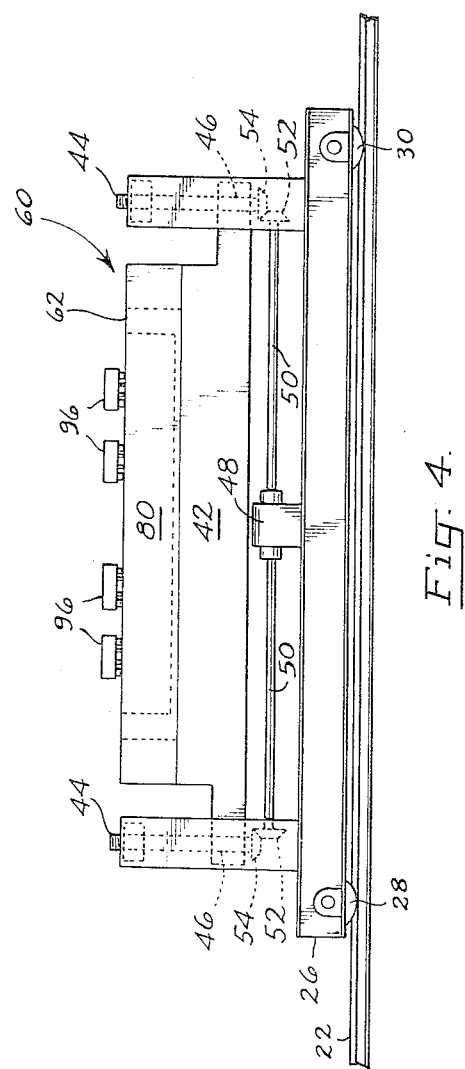

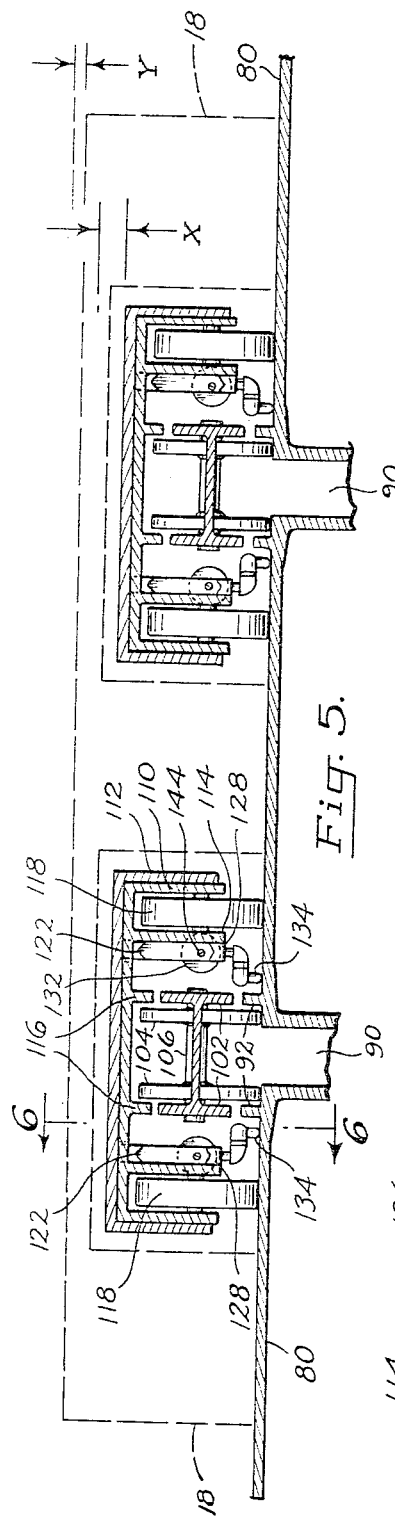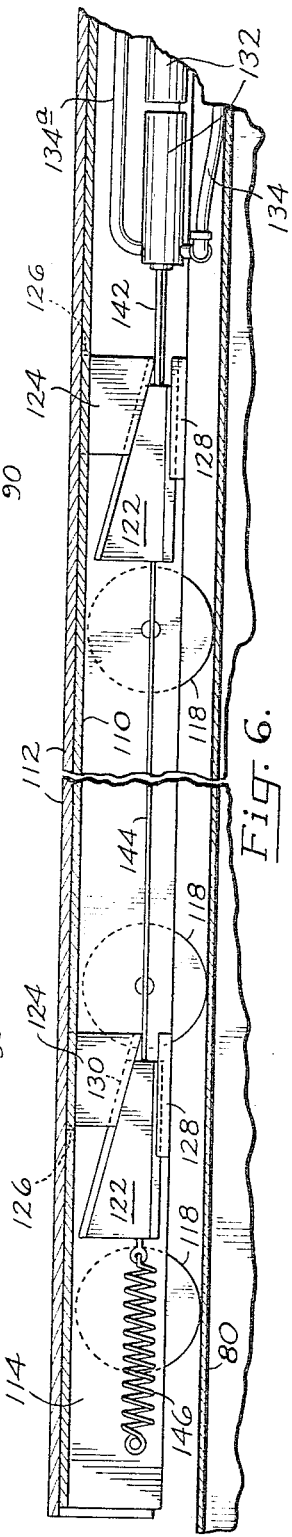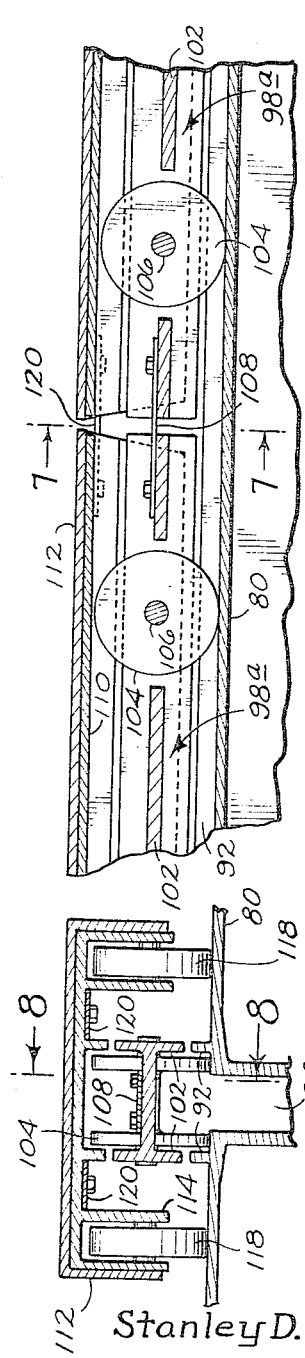

3,313,429
VEHICLE LOADING AND UNLOADING
APPARATUS
Stanley D. Cole, 8021 S. Fawcett,
Tacoma, Wash. 98408
Filed Jan. 18, 1965, Ser. No. 426,149
3 Claims. (Cl. 214—38)

The present invention pertains to apparatus for loading and unloading vehicles. It relates in general to apparatus for transferring loads between a loading station and a vehicle.

The invention is applicable particularly to the loading and unloading of trucks and is described herein with particular reference to this application, but without limitation since it also may be applied to the loading and unloading of vehicles of other classes such as railroad freight cars, aircraft and ships, and in general to the containerized movement of goods.

It is the general object of the present invention to provide apparatus for loading and unloading vehicles, particularly trucks, which, in contrast to the prior art lift truck and/or hand loading methods, is rapid, versatile, and broadly applicable to the loading and unloading of vehicles of various categories in various situations.

Further objects of the present invention are the provision of apparatus for loading and unloading vehicles which: handles the load units safely without dropping or damaging them; makes use of substantially all of the restricted space in the vehicle body, since it is not necessary to leave head room for the operation of a lift truck; compensates for vertical misalignment of the loading apparatus with the vehicle bed and loading station; compensates for horizontal misalignment of the vehicle body and the load units; compensates for irregularities of loading area surfaces; eliminates the time-consuming procedure of backing up the truck to the loading deck where it receives its load; may be provided and used in various sizes; handles both palletized and unpalletized load units; is operable either to load or unload the vehicle without modification of the apparatus; is operable to load and unload from either of its sides without special adjustment; selects load units from classified stock piles, making possible loading the vehicle with selected work units; can be used to load the vehicle completely in a single operation or load it partially with any desired number of load units; does not require the cooperative assistance of a lift truck and/or conveyer system for completion of the loading and unloading operations.

In the drawings:

FIG. 1 is a perspective view of the herein described loading and unloading apparatus illustrated in its operative relation to a loading dock and a truck;

FIG. 2 is a foreshortened plan view, partly broken away of the loading and unloading apparatus of FIG. 1;

FIG. 3 is a foreshortened view in side elevation of the loading and unloading apparatus of FIGS. 1 and 2;

FIG. 4 is a view in end elevation of the apparatus of FIGS. 1–3;

FIGS. 5, 6, 7 and 8 are enlarged fragmentary detail views illustrating the load lifting and conveying units of the apparatus of FIGS. 1–4; FIG. 5 being a transverse sectional view; FIG. 6 being a longitudinal sectional view along line 6—6 of FIG. 5; FIG. 7 being a transverse sectional view along line 7—7 of FIG. 8; and FIG. 8 being a transverse sectional view along line 8—8 of FIG. 7; and FIG. 9 is a schematic view of the drive for the load lifting and conveying unit of the preceding figures, with the elements partly separated better to show their relation to each other.

In its broadest aspect the vehicle loading and unloading apparatus of my invention comprises a support frame adapted to be positioned beween a loading station and a truck or other vehicle. A load carrying tongue reciprocatably is mounted on the frame. Reversible load lift means are mounted on the tongue. Tongue drive means are connected to the tongue for reciprocating it between a retracted position in which it overlies the frame and an extended position in which it extends into the vehicle.

Normally the support frame may be mounted on wheels which move on tracks to locate the apparatus adjacent a loading station or vehicle. Jack means are provided for raising and lowering each end of the frame selectively to align it vertically with the loading station or vehicle. Adjusting means are coupled to the tongue for adjusting its horizontal position to align it with the load units.

In the use of the apparatus, the wheeled support frame may be moved opposite the selected load unit. The elevation of the frame and the angle of the tongue then are adjusted as necessary. The tongue is extended under that part of the load which is to be handled. The load is lifted by the lift means on the tongue and the tongue retracted to transfer the load to the wheeled support frame.

The latter then is moved until it is in loading position with respect to the vehicle to be loaded. Vertical adjustment of the frame and horizontal adjustment of the tongue and superimposed load then are made if necessary.

The tongue and superimposed load are extended into the vehicle and the load lowered to the vehicle bed. During this operation the frame height may be adjusted to that of the vehicle as the springs of the latter deflect when taking load. The tongue then is withdrawn and the mobile frame removed to its next location with respect to a loading station.

The foregoing procedure is repeated as often as necessary to load the vehicle. It is reversed when it is desired to unload the vehicle.

Considering the foregoing in greater detail and with particular reference to the drawings:

As shown in FIG. 1, the loading and unloading apparatus of my invention may be employed usefully in a typical situation in which it transfers work units between separated, opposed loading docks 10, 12 and a truck or other vehicle, the body of which is indicated at 14. The work unit 16 to be transferred may be supported on pallet 18 of the usual construction including a top plate fastened to parallel, spaced runners. In the alternative, the load units on the dock and in the vehicle body may be supported on built-in ribs, not illustrated, but which correspond in spacing and function to the runners of pallets 18.

The apparatus is mounted on a support frame which preferably is mobile, e.g. a mobile car indicated generally at 20 in FIG. 1. The car moves on rails 22 running between loading docks 10, 12 and truck 14, substantially at right angles to the direction in which the load units move during the loading and unloading operation.

The mobile car has for one of its primary purposes the transportation of load units 16 rapidly from a substantial distance into loading relation with the truck, thus eliminating the necessity of employing lift trucks for this purpose. It includes a frame supported on two pairs of spaced parallel, longitudinal beams 24, and on special parallel transverse beams 26. Wheels 28 are journaled between the forward ends of beam pairs 24 and wheels 30 are journaled between the rearward ends of the same beam pairs, thus mounting the frame on tracks 22.

The mobile frame is driven along the tracks by a reversible motor 32 mounted on one of transverse beams 26. The motor drives a chain 34 which is coupled to a drive shaft 36, the ends of which mount or are connected to drive wheels 28.

The load-lifting and conveying tongue assembly is supported on a pair of standards located one on each end of the mobile frame and each comprising a pair of uprights 38 and a transverse cross piece 40.

Cross pieces 40 support a floating, vertically adjustable sub-frame including spaced, parallel, longitudinal box beams 42 having thickened central sections as appears particularly in FIG. 4.

Sub-frame members 42 are supported on cross pieces 40 by reversible lift members arranged in such a manner that one or the other of the sub-frame members selectively may be elevated or lowered as required to adjust the elevation of one end or the other of the tongue conveyor.

In the form of the invention illustrated, the reversible lift means comprise pairs of jack screws 44, one pair being located on each side of the frame. The jack screws work in nuts 46 mounted on the respective ends of beams 42.

Each pair of jack screws is driven independently of the other pair by a drive including reversible motor 48 supported by box beam 42 and coupled to diametrically opposed horizontal shafts 50. Bevel gears 52 on the outer ends of the shafts mesh with bevel gears 54 on the lower ends of jack screws 44. Thus by suitably driving motor 48 of one of the jack screw pairs, the jack screws may be operated to raise or lower the corresponding sub-frame members 42 to the desired elevation.

A tongue-supporting bed is mounted transversely across vertically adjustable beams 42. It is indicated generally at 60, FIG. 4, and has for one of its primary functions mounting the tongue in such a manner that it may be adjusted horizontally as required to align it with the load units, and especially to align it so that it may be inserted readily between the runners of pallets which may be somewhat misaligned with the longitudinal axis of the tongue.

As shown particularly in FIG. 2, bed 60 is fabricated from a pair of longitudinal end pieces 62 having inner arcuate side edges; a pair of transverse end pieces 64 and a plurality of spaced support bars 66, 68, 70 and 72. A support plate 74 spans plates 68, 70 centrally thereof and mounts an upwardly extending pivot pin 76.

There thus is provided means for pivotally mounting a platform indicated generally at 80 and having for its function mounting the tongue for horizontal, angular movement to align it with the load. The platform is mounted in the recess between end pieces 62 and side pieces 64 of bed 60. It is fixed to pivot pin 76 and its lower under surface is in sliding contact with bed frame members 66, 72.

The platform unit is driven by reversible motor 81 connected through a gear box 82 to a crank 84. The crank is provided with an upwardly projecting pin 86 which works in a slot 88 present in the under surface of platform 80. Accordingly, by rotating motor 81 in one direction or the other, the entire platform may be moved angularly in a corresponding direction to align it with the load units.

The top of platform 80 is provided with parallel slots 90 which accommodate the cable drives for the tongue and with guide bars 92 which guide the tongue in its reciprocative movement (FIG. 5).

The tongue component of the assembly, illustrated particularly in FIGS. 1 and 5–9, is constructed in two units. Each is capable of handling a load independently of the other. In addition, each of the tongue units is comprised of two tongue sections which work together and which are extendable into the two recesses which are present between the runners of the conventional pallet.

Each of the tongue sections, in turn, is composed of two telescoping components, i.e. an extension component which permits extension of the tongue to a substantial length, and a carriage component, which supports and lifts the load.

The tongue sections also preferably are divided transversely into a plurality of articulated segments to accommodate the tongue to inequalities of elevation between the loading apparatus and the truck bed, or loading dock, as well as to roughness and irregularities which may be present on the floors of either.

The tongue segments are connected together in articulated relation. Their number and length are determined primarily by the distance to be spanned by the tongue and the size and weight of the load units to be carried. Where a 28 foot truck or trailer is to be loaded, the tongue may be divided into five segments, i.e. three 6 foot intermediate segments and two 5 foot terminal segments. On the other hand, if a 40 foot truck or trailer is to be loaded, the tongue may be composed of seven segments, i.e. five 6 foot intermediate segments, with a 5 foot terminal segment at each end.

As seen particularly in FIGS. 1 and 2, there are two independent tongue units indicated generally at 94 and 94a. Each tongue unit is operated independently of the other and each includes two cooperating tongue sections 96, 96a. Each tongue section is subdivided into an extension component 98 and a telescoping carriage component 100 (FIG. 9). Each extension component in turn is divided transversely into an appropriate number of extension component segments 98a and each carriage component is divided transversely into an appropriate number of carriage component segments 100a.

Referring now particularly to FIGS. 5, 7 and 8:

Each of the segments 98a of tongue extension component 98 comprises a length of H-beam 102 having portions cut away to accommodate wheel pairs 104 rotatably mounted on shafts 106. Wheels 104 track on platform 80, being guided in part by guide bars 92.

Tongue extension component segments 98a are connected end to end in flexible, articulated sequence by means of flexible bar connectors 108. These may comprise sections of leaf spring and are bolted or otherwise connected between the central web members of adjacent segments.

The construction of carriage component segments 100a of the tongue sections is evident in FIGS. 5–8 inclusive. As has been explained above, these segments not only contact and carry the load, but also raise it and lower it as required in the loading and unloading operations.

Each carriage component segment 100a comprises a pair of nesting channel frame members 110, 112. The underlying channel member 110 supports a pair of plates 114 as well as a pair of guide bars 116. Wheels 118 are journaled between each of the side pieces of the channel member and the adjacent plate 114. Guide bars 116 cooperate with guide bars 92 on platform 80 in guiding wheels 104 of extension component segments 98a.

Like the latter segments, carriage component segments 100a are connected end to end in flexible, articulated sequence by connecting bars 120. These may be fabricated from strips of spring steel and are connected between the segments in suitable manner, as by being bolted thereto.

The construction of the lifting mechanism associated with the tongue is illustrated in FIGS. 5 and 6. It is so arranged that overlying channel member 112 may be raised and lowered with reference to underlying channel member 110.

As shown in FIG. 5, when the tongue segments are inserted in the spaces between the runners of pallet 18, overlying segment 112 may be lifted by an increment $x$ of FIG. 5. This in turn lifts the pallet and the load supported thereby by increment $y$ of the same figure, clearing the load so that it may be moved by the tongue.

Although various types of lifting mechanism may be employed, in the illustrated form of the invention I have provided a cam lift including a wedge-shaped cam 122 on underlying channel member 110 and a cooperating cam follower 124 depending from the under side of overlying channel member 112 through a slot 126 in the former, provided for this purpose. The cam lifts may be used in pairs if desired for heavy loads.

The longitudinal side edges of cam member 122 are beveled. The lower beveled edge is received in a slide 128 mounted on the inner face of plate 114. The upper beveled edge is received in guide 130 provided on the lower edge of cam follower 124.

The cam lifts including elements 122, 124 are mounted at suitable intervals along the length of tongue sections 96, 96a. At least one such lift may be provided to advantage opposite each of wheel pairs 104, 118. Where the tongue sections are long, it may be desirable to arrange the lifts in groups, as indicated schematically in FIG. 2.

All or part of the cam lifts in a given tongue section are driven in unison by a drive which includes a fluid operated cylinder, preferably a hydraulic cylinder 132 supplied with hydraulic fluid through lines 134, 134a. Lines 134 are mounted on reels 138 arranged, together with guide pulleys 140, to take up and pay out the line with the reciprocation of the tongue units.

The piston rod 142 of each cylinder is coupled to the adjacent one of cams 122. The latter in turn is coupled by means of a link 144 to the next one of cams 122. The cams are linked together in this manner throughout the entire length of the tongue section.

Terminal cam 122 is connected to one end of a coil spring 146. The other end of the spring is pinned to plate 114 of the tongue.

Accordingly cams 122 may be operated in unison. With the retraction of piston rod 142, they are moved to the right as viewed in FIG. 6, lifting overlying channel member 112 of the tongue carriage segments. Spring 146 is extended during this operation. When cylinder 132 is deenergized, spring 146 draws the cams to the left, as viewed in FIG. 6, thereby lowering overlying channel member 112, with the assistance of the weight of the load.

The drive by which the telescoping extension and carriage components 98, 100 of each of tongue sections 96, 96a are extended and retracted relative to each other, is illustrated in FIGS. 2, 3 and 9.

A reversible motor 150 drives a gear reducer 152, the shafts of which are coupled to shafts 154 journaled in the frame of the apparatus.

Keyed to shafts 154 are drive pulleys 156, one for each of tongue sections 96, 96a. A drive cable 160 is reeved about drive pulley 156 as well as about idler pulleys 162, 164 rotatably mounted at the respective ends of platform 80.

One end of drive cable 160 is anchored to anchor point 166 on a terminal one of tongue segments 98a of extension component 98. The other end of drive cable 160 is anchored to anchor point 168, on the other terminal one of tongue segments 98a of extension component 98.

One end of a first drive transmitting cable 170 is anchored to stationary anchor point 172 on a frame member of platform 80. The cable is reeved about an idler pulley 174 rotatably mounted on the outer end of tongue extension component 98. The other end of cable 170 is anchored to anchor point 176 of the inner end of tongue carriage component 100.

One end of a second drive transmission cable 178 is fastened to anchor point 180 on the frame of platform 80. The cable is reeved about an idler pulley 182 rotatably mounted on the inner end of tongue extension component 98. The other end of cable 178 is fixed to an anchor point 184 on the outer end of tongue carriage component 100.

Thus, as cable drive drum 156 is rotated in one direction or the other, it moves tongue extension component 98 by cable 160. Movement of component 98 in turn moves tongue carriage component 100 in one direction or the other through the driving action of one or the other of drive transmitting cables 170, 178.

It will be noted in this connection that the mechanical advantage achieved by the cable arrangement results in the carriage component moving a distance which is double the distance moved by the extension component of the tongue. This makes it possible for a small size loader 10 to load a large size truck.

*Operation*

The operation of the herein described loading and unloading apparatus is as follows:

First load units 16 arranged on pallets 18 are classified as desired on loading docks 10, 12. Motor 32 is energized to drive mobile frame 20 until it is substantially aligned with the selected load units.

One of motors 48 is energized to elevate one end or the other of the mobile frame into vertical alignment with the loading dock, through the agency of pairs of jack screws 44.

Motor 81 is energized to align the tongue units mounted on the platform horizontally with the axis of the load units, specifically with the space between the runners of pallets 18 if misalignment should exist, through the agency of crank pin 86 which moves platform 80 angularly about pivot pin 76.

Motor 150 is energized driving drive pulleys 156 and associated drive cable 160 to extend telescoping tongue section components 98, 100 relative to each other, FIG. 9, until they have been placed in operative location beneath the desired number of work units.

Cylinders 132 then are operated to actuate wedging cams 122, FIG. 6, elevating overlying channel member 112 from its associated nested channel member 110. This lifts the overlying channel member by increment $x$ of FIG. 5, which in turn elevates pallet 18 and the superimposed load by increment $y$ of the same figure, clearing the supporting floor of the dock.

Motor 150 then is energized to retract the tongue component and mount the load units on the mobile frame.

Motor 32 then is used to drive the mobile frame to the loading position of FIG. 1. The elevation of the discharge end of the apparatus is adjusted if necessary by operation of jack screws 44.

Motor 150 then drives the tongue units into truck body 14; cylinders 132 are retracted to lower the work units to the floor; and motor 150 is reversed to withdraw the tongue units from the truck body. This completes the loading operation.

To unload the truck, the foregoing sequence may be reversed.

It accordingly will be seen that there is provided an apparatus in which the several objects of this invention are achieved and which is well adapted to meet the conditions of practical use.

It is to be understood that the form of my invention herein shown and described is to be taken as a preferred example of the same and that various changes in the shape, size and arrangement of parts may be resorted to without departing from the spirit of my invention or the scope of the subjoined claims.

Having thus described my invention, I claim:

1. Vehicle loading and unloading apparatus comprising:
    (a) a support frame adapted to be positioned between a loading station and a vehicle,
    (b) a load-carrying tongue reciprocatably mounted on the frame and comprising a pair of superimposed tongue components,
    (c) reversible load lift means on the tongue and comprising cam means working between the sections for reversibly lifting the overlying component with respect to the underlying component, the cam means including guide means through the underlying component, a cam follower fixed to the overlying component and extending through the guide means, a cam mounted on the underlying component in working relation to the cam follower, and a fluid operated cylinder connected to the cam for moving it in driving relation to the cam follower, and
    (d) tongue drive means connected to the tongue for reciprocating it between a retracted position in which it overlies the frame and extended position in which it extends into the vehicle.

2. Vehicle loading and unloading apparatus comprising:
    (a) a support frame adapted to be positioned between a loading station and a vehicle, (b) a load-carrying tongue reciprocatably mounted on the frame for horizontal extension and retraction relative to the latter,
(c) a load-lifting member mounted on the tongue for vertical movement relative thereto,
(d) reversible drive means interengaging the tongue and load-lifting member for moving the latter vertically relative to the tongue, and
(e) tongue drive means connected to the tongue for reciprocating it between a retracted position in which it overlies the frame and an extended position in which it extends into the vehicle,
(f) the tongue being formed in a plurality of tongue segments arranged end to end and including flexible connecting means connecting the segments one to the other, the flexible connecting means comprising flexible bars connected between the respective segments.

3. Vehicle loading and unloading apparatus comprising:
(a) a support frame adapted to be positioned between a loading station and a vehicle,
(b) a load-carrying tongue reciprocatably mounted on the frame for horizontal extension and retraction relative to the latter,
(c) a load-lifting member mounted on the tongue for vertical movement relative thereto,
(d) reversible drive means interengaging the tongue and load-lifting member for moving the latter vertically relative to the tongue, and
(e) tongue drive means connected to the tongue for reciprocating it between a retracted position in which it overlies the frame and an extended position in which it extends into the vehicle,
(f) the reversible drive means comprising cam means working between the tongue and load-lifting member for reversibly lifting the latter with respect to the tongue, the cam means including guide means through the tongue, a cam follower fixed to the load-lifting member and extending through the guide means, a cam mounted on the tongue in working relation to the cam follower, and reciprocating drive means connected to the cam.

References Cited by the Examiner

UNITED STATES PATENTS

| | | | |
|---|---|---|---|
| 1,824,201 | 9/1931 | Eisenberg | 214—16.4 X |
| 1,830,740 | 11/1931 | Leech et al. | 214—38 |
| 2,004,095 | 6/1935 | Hankins et al. | 214—38 |
| 2,574,045 | 11/1951 | Lapham | 214—731 |
| 2,626,065 | 1/1953 | Sanders et al. | |
| 2,828,027 | 3/1958 | Stevenson et al. | 214—38 |

GERALD M. FORLENZA, *Primary Examiner.*

ROBERT G. SHERIDAN, *Examiner.*